United States Patent [19]

Berce et al.

[11] Patent Number: 5,447,592
[45] Date of Patent: Sep. 5, 1995

[54] PROCESS FOR GLUEING TWO NON-METALLIC SUBSTRATES BY MEANS OF AN ADHESIVE

[75] Inventors: Tatjana Berce, Geneva; Michel Kornmann, Grand Lancy; Jacques Vermot-Gaud, Perly; Guy Negaty-Hindi, Onex, all of Switzerland

[73] Assignee: Battelle Memorial Institute, Carouge-GE, Switzerland

[21] Appl. No.: 232,019

[22] PCT Filed: Aug. 17, 1993

[86] PCT No.: PCT/CH93/00205

§ 371 Date: Apr. 22, 1994

§ 102(e) Date: Apr. 22, 1994

[87] PCT Pub. No.: WO94/04623

PCT Pub. Date: Mar. 3, 1994

[30] Foreign Application Priority Data

Aug. 24, 1992 [CH] Switzerland ............ 2622/92

[51] Int. Cl.⁶ ........................ B32B 31/00
[52] U.S. Cl. .......................... 156/272.4
[58] Field of Search .................... 156/272.4

[56] References Cited

U.S. PATENT DOCUMENTS 5,129,977  7/1992  Leatherman ............ 156/272.4

Primary Examiner—Chester T. Barry
Attorney, Agent, or Firm—Cushman Darby & Cushman

[57] ABSTRACT

A process for glueing together two non-metallic substrates with a hot polymerizable adhesive wherein a ferromagnetic or ferrimagnetic filler material is distributed within the substrate and/or adhesive and the combination is subjected to induction heating by means of a magnetic field. The filler comprises particles having a defined size range, resistivity, coercive field and induced magnetic field such that the sum of the Foucault current losses and hysteresis losser permit the filler to provide power of 1000 to 10,000 W/cm³. The heating temperature is limited to about the maximum temperature of polymerization of the adhesive by fixing its duration to less than 60 seconds whereby the temperature of the adhesive/substrate interface is at least the minimum polymerization temperature.

9 Claims, No Drawings

PROCESS FOR GLUEING TWO NON-METALLIC SUBSTRATES BY MEANS OF AN ADHESIVE

The present invention relates to a process for glueing two non-metallic substrates by means of an adhesive with the aid of a hot-polymerizable resin.

It has already been proposed to add ferromagnetic or ferrimagnetic fillers to hot polymerizable resins in order to heat them by induction.

If this kind of heating process is to have commercial value relative to heating in a furnace, in which the resin substrate assembly is brought progressively to the higher temperature of polymerization of the resin, this heating must make it possible to put the entire mass of resin, and above all the resin/substrate interface, at the temperature of polymerization within a period of less than 1 minute, with the temperature of polymerization not dropping below the lower limit of polymerization. This heating time must not involve very high frequencies, whose use on an industrial scale presents excessive problems, both in terms of equipment and of safety; it must no longer involve overly high proportions of fillers, at the cost of impairing the mechanical properties of the resin. Given the poor thermal conductivity of both the resin and the substrate that are to be glued, the temperature of the particles heated by induction must not substantially exceed the upper temperature of polymerization, at the cost of spoiling the resin in contact with the particles by excessive temperature. In other words, the rise in temperature of the particles must be relatively slow, to enable diffusion of the heat to the resin and the substrate. The heating is interrupted as soon as the upper polymerization temperature is reached. If this rise in temperature is overly rapid, then it must also be interrupted as soon as the upper polymerization temperature is reached, to enable the heat to diffuse, but the alternating induction field must then be re-applied until the energy necessary for the polymerization has been transmitted.

It is known that the thermal energy generated by induction in a magnetic field may be the result of three types of losses: Foucault current losses, which increase with the dimensions of the conductor element, and which are higher, the lower the resistivity; hysteresis losses, which are virtually independent of the size but are dependent on the shape of ferromagnetic or ferrimagnetic particles, and which are greater than the Foucault current losses in the case of fine particles; and residual losses, which involve phenomena such as dielectric losses or "magnetic viscosity", which represent a major part of the losses in the case of ferrites. The Foucault current losses and hysteresis losses increase with the square of the frequency, and the frequency, respectively.

In the case of heating of a resin by incorporating fillers capable of heating by induction, hysteresis losses have already been a preoccupation in the prior art, and particles capable of rising to temperature more rapidly thanks to these losses have therefore been sought.

This is the teaching in particular of European Patent Disclosure EP 82 403 276, in which particles have been sought that have high coercive magnetic fields associated with magnetic induction fields of from 1 to 15 times the coercive force of the heating particles. This leads to a choice of very fine particles, less than 1 $\mu$m in size, with very high resistivity in high concentration, and to the employment of magnetic fields that may range as high as 480 kA/m. No information whatever is provided about the mechanical properties obtained when this process is used to glue two nonmetallic substrates with the aid of an induction-heated resin.

U.S. Pat. No. 5,075,034 relates to a version in which conductive carbon black is associated with ferromagnetic or ferrimagnetic particles in an adhesive composition. The purpose of the carbon black is to lower the volumetric resistivity of the adhesive mixture in order to enable rapid induction heating at relatively low frequency, doubtless by Foucault current. This version leads to the use of a relatively large proportion of solid matter in the resin, which is likely to impair its glueing properties.

The object of the present invention is to demonstrate that it is possible to work at frequencies less than 250 kHz, and to polymerize or prepolymerize the resin in less than 60 seconds with a shear strength of more than 50% of the strength in glueing by furnace polymerization, by using a low proportion of ferromagnetic or ferrimagnetic fillers.

To that end, the subject of this invention is a process for glueing two nonmetallic substrates with the aid of a hot polymerizable resin. This process may be defined as one for glueing two nonmetallic substrates by means of a hot polymerizable adhesive, the thermal conductivity of the substrates and of the adhesive being less than 0.9$^W$/m °C., by which between 1 and 20 weight % of fillers of ferromagnetic or ferrimagnetic materials are distributed within at least one of the elements, that is, the substrates or the adhesive, and the whole is subjected to a magnetic field with a frequency of between 10 kHz and 1 MHz in order to heat the fillers by induction, characterized in that either a material with a resistivity of between 10 and $10^{-8}\Omega$ per meter with a coercive field of $<60$ A/m, an induced magnetic field of $<1000$ mT and a particle size of 1500 to 1000 $\mu$m$^3$, or a material with resistivity of between 10 and 10$\Omega$ per meter, with a coercive field between 60 and 12,000 A/m, an induced magnetic field of between 1000 and 10,000 mT and a particle size between 1 and 1500 $\mu$m$^3$, is chosen, such that the addition of the Foucault current losses and hysteresis losses makes it possible to produce a power of these fillers of from 1000 to 10,000 W/cm$^3$, and that the heating temperature is limited to approximately the maximum temperature of polymerization of the adhesive by fixing the duration at less than 60 seconds, and preferably less then 40 seconds, so that the energy thus produced heats the adhesive and so that the temperature at the adhesive/substrate interface corresponds at least to the minimum temperature of polymerization in order to obtain a shear strength greater than 50% of the strength of the glueing together of the substrates when the adhesive is furnace polymerized.

The advantage of the present invention is to make it possible to obtain equivalent or even superior results to those of the prior art, without having the aforementioned disadvantages. It will be seen in the ensuing description that the choice of parameters according to the invention enables good transmission of the energy to the resin and to the resin/substrate interface, without exceeding in duration the time fixed as a function of industrial imperatives.

This invention illustrates several factors that do not seem to have drawn attention until now, specifically:
  the uselessness, even the disadvantage, of having overly rapid heating of the ferromagnetic or ferrimagnetic fillers in a medium that has low thermal conductivity;

the necessity of heating not only the resin but also the resin/substrate interface, or in other words at least a portion of the substrate, without which one can have a perfectly polymerized resin in the vicinity of the joint and negligible shear strength;

the possibility of having little in the way of filler without in return having very high maximum values for the coercive field and induction, despite the frequencies to which the process is limited for the sake of industrial imperatives;

the fact that it is not necessary to choose the ferromagnetic or ferrimagnetic particles solely as a function of hysteresis losses, but rather that the other losses, that is, Foucault current losses and residual losses, make it possible to obtain the energy desired even if the hysteresis losses are not optimal.

These reflections, taken all in all, have led to the choice of the parameters of the glueing process according to the invention.

Further advantages of this invention will become apparent from the ensuing description and the examples accompanying it.

For carrying out the tests, an induction coil 40 mm in length including six oval spirals 20×30 mm in size, supplied by a 6 kW, 200 kHz, voltage-controlled generator, was used.

The samples to be glued comprise two substrates 25 mm in width and 3 mm in thickness, covered over 25 mm, and the space made between the substrates for the glue is 2 mm. In the case of composite glass fiber polyester substrates molded in sheet form, known by the abbreviation SMC (sheet molding composition), the glue used is either of the polyurethane or of the single-component epoxy type.

Other hot polymerizable glues may be used, depending on the nature of the substrate. The fillers are always added to the resin. Nevertheless, they may also be added to the substrates to be glued, in order to reduce the temperature difference between the area of the bond and the substrate and to guarantee a sufficient polymerization temperature at the substrate/adhesive interface. The tests have shown that this is not indispensible, but may be useful. When the thickness of the adhesive is very slight, especially on the order of 0.1 mm, the fillers can either be put in the substrate or in the adhesive, or in both, but this latter alternative is not very useful, given the slight thickness of the adhesive to be heated; with such a thickness, the adhesive can be heated equally well from inside or outside.

In a variant; it is also conceivable in the case of a composite substrate reinforced with glass fibers to simply replace the glass fibers with fibers of ferromagnetic or ferrimagnetic materials obtained in particular by a technique of extraction from the molten material. Besides having the effect of reinforcement of the resin, comparable to that achieved by glass fibers, these fibers are suitable for induction heating and may be dimensioned, and/or the composition adapted, such as to have resin heating properties comparable to the other types of fillers.

On this subject, it should be recalled that the form of the fillers has a major influence on the demagnetization factor and hence on the real magnetic field within the material, and that this influence increases with the increase in relative permeability $\mu_r$ of the material. Hence the magnetic field and the magnetic induction (B) within a highly oriented fiber are higher than within a spherical particle or a particle with a flat portion.

If the parameters that influence the various losses when the fillers are subjected to a magnetic field are now investigated, it will be recalled that the Foucault current losses are proportional to the squares of the amplitude of the induced magnetic field $B_m$, the size D of the particles and the frequency f, and are inversely proportional to the resistivity $\phi$ of these particles. These losses are accordingly appreciable for relatively large particles (typically 50 to 100 $\mu$m) with a resistivity of $<10 \cdot 10^{-8} \Omega \cdot m$, and the induction amplitude $B_o > 0.01$ Tesla. It should also be recalled that this is valid only when the skin effect is negligible, or in other words when its depth is greater than the radius of the particle. By way of example, at 200 kHz, this depth is 0.14 mm for iron.

For hysteresis losses, it will be recalled that when a magnetic material is subjected to an alternating excitation field, the induction B describes a hysteresis loop as a function of the field. The surface area of this loop is nearly equal to 4 $B_{max}H_c$, where $B_{max}$ is the maximum induction in Teslas and $H_c$ is the coercive field in A/m. This surface area is an energy per unit of volume (J/m$^3$). When the hysteresis loop has been completely traversed, or in other words when the maximum excitation field is greater than the coercive field $H_c$, the energy dissipated is equal to this surface area. The dissipated power is proportional to the frequency, which corresponds to the number of times the hysteresis loop is traversed per unit of time.

Except for this skin effect, which may be greater than the radius of the particles, the dimension of these particles has no influence on hysteresis losses when $H_c$ is constant.

Conversely, the form of the particles has major importance for these hysteresis losses, because of the influence of this form on the real magnetic field inside the particles, as has been explained above. Taking into account the demagnetization factor with spherical particles, the magnetic permeability is limited to three, while with acicular particles, which typically have a ratio of length to width of 10, the demagnetization factor decreases and the effective permeability is typically between 30 and 50 for $\mu_r=100$ or 1000, respectively. Consequently, the value of the maximum induction field $B_{max}$ is 10 times higher for acicular particles with a width to length ratio of 10 having a relative permeability $\mu_r > 100$ than for spherical particles.

To heat the adhesive composition to its polymerization temperature, a power is required, taking into account the volume to be heated, the density of the resin, its specific heat, the temperature for polymerizing it, the thermal efficiency taking into account losses in the substrate, and the heating time. This power for the tests mentioned above is on the order of 8 to 20 W per bond. To select the fillers to be added to the adhesive, it is important to determine the specific powers relating to the weight of the adhesive filled or to the weight of the fillers. The specific power relating to the weight of filled adhesive varies from 9.6 W/g of adhesive to 4.8 W/g, depending on whether the thermal efficiency is 50% or 100%. The specific power for the fillers varies from 1000 to 10,000 W/cm$^3$ of fillers depending on the efficiency and the filler concentrations.

To obtain effective heating of the adhesive, which is a medium of poor thermal conductivity, it is important that the particles not be overly large, or in other words that they have a high exchange surface area in proportion to their volume; otherwise, the heat of the particles increases rapidly, and there is a risk of spoiling the adhesive in contact with these particles from excessive temperatures, before the mass of the adhesive reaches the polymerization temperature.

The geometry of the samples used during the tests has already been indicated above. The examples that follow were carried out under the following conditions: Before the adhesive was applied, the surfaces of the substrates to be glued were cleaned with trichloroethane. The polyurethane-type adhesive used is Togocoll FPM 500/24566, FMP 500/90096, made by EMS TOGO, CH-8590 Romanshorn, Switzerland. These are adhesives whose polymerization temperature ranges from 90° to 120° C. The 1C epoxy component used is Naftotec 1361 made by Chemetall, whose polymerization temperature ranges from 120° to 140° C.

The samples were obtained by mixing the fillers with the adhesive until the dispersion was homogeneous. The adhesive was then applied to one of the substrates, which was then placed on a template intended for use in making reproducible sets of substrates, and then the second substrate was placed on the template and pressed so that the spacing of approximately 2 mm between the substrates was formed thanks to the substrate. The adhesive that spills over from the surface of the substrates is removed.

As indicated, the losses in the fillers subjected to the magnetic field of given amplitude and frequency depend on the nature of the material, the concentration, the size, and the form of the particles.

Under these conditions, certain fillers were used as shipped. Others were sifted beforehand. Finally, the ceramic materials are not available in powdered form and so they were ground in a ball bill and sifted, in order to retain only those particles less than 45 µm in size.

Samples of adhesives with different concentrations of fillers were prepared in order to determine the filler concentration suitable for obtaining the desired temperature in less than 45 seconds.

In order to define the duration of heating, the development of smoke discharge that ensues above 130° C. was observed and the heating time measured, and then this duration was progressively reduced in order to reach 120° C.

Temperature measurement was done with the aid of a thermocouple. Since a thermocouple heats in an alternating magnetic field, the measurement is done when the magnetic field stops.

The rise in temperature in the adhesive is virtually linear with time. The higher the supply voltage to the inductor, the more the heating time decreases.

The distribution of temperature in the adhesive connection was unable to be uniform in the case of poor dispersion of the fillers and in the presence of agglomerates, so that certain zones could be overheated and others could not be properly polymerized. The risk of forming agglomerates is especially pronounced for particles <5 µm in size. The lower the thermal conductivity of the adhesive, the more important it is to not mix together particles of overly different size, which do not heat and cool in the same way, and which have the result that the adhesive is not uniformly polymerized.

It has been found that the shorter the rise in temperature, the shorter the cooling is also. This signifies that the total energy transmitted to the adhesive, represented by the surface area formed by the heating/cooling curve as a function of time, is less when the rise in temperature is rapid than when it is slower.

This demonstrates that it is not necessarily desirable to choose fillers with the greatest hysteresis losses and to apply a very strong magnetic field to them, as had been believed until now. Hence the metallic materials having resistivity less than ferrites and slight or even very slight hysteresis losses, like iron, are not necessarily lacking in value, as will be seen in these examples. Considering the fact that the Foucault current losses are slighter with fine particles, it is recommended in that case to increase the size of the particles to between 75 and 150 µm, a range in which the Foucault current losses become substantial.

With fast-heating particles, the maximum polymerization temperature is reached rapidly. Since the energy transmitted to the adhesive and the substrate is insufficient, it is then necessary to reheat the fillers as soon as the temperature has dropped by a certain value, without allowing them to cooling to ambient temperature so as not to interrupt the polymerization reaction. This reheating obtained by resupplying current to the induction coil can be repeated until the energy transmitted to the adhesive and to the substrate suffices to obtain polymerization that lends the bond a strength of greater than 50% of the strength resulting from furnace polymerization.

A third means exists for limiting the heating power while guaranteeing the production of the requisite energy over a duration of greater than 45 seconds; this means consists of choosing particles whose Curie point is slightly higher than the maximum polymerization temperature of the adhesive, such that even if the rise in temperature is rapid, there is no risk whatever of overheating the adhesive, so that it suffices to adjust the duration of heating to achieve the necessary energy.

EXAMPLE 1

10 weight % of magnetite $Fe_3O_4$ made by Norsk Hydro was added to the aforementioned adhesive FPM 500/24566. The mean particle size was on the order of 10 µm, and the magnetic induction field was on the order of 60.4 kA/m (supply voltage 5 kV). The heating time to heat the adhesive to 120° C., and in order that the temperature of the substrate near the adhesive not drop below 90° C., the lower limit of polymerization, is 30 seconds. The shear strength is 60% of the strength obtained by furnace heating is 60%. The coercive field of the particles at ambient temperature is 12,000 A/m, and the maximum induction Bs is 800 mT. The resistivity of the material whose particles were used is $10^{-4} \Omega \cdot m$.

EXAMPLE 2

Norsk Hydro magnetite was used in the form of fibers obtained by extraction from the molten material and having an L/D ratio of 50, with a diameter of 20 µm. By applying the same field as in Example 1 and with the same proportion of 5 weight %, the duration of heating is 15 seconds.

EXAMPLE 3

Magnetite from Cerac with spherical grains of uniform size on the order of 3 µm, with a purity of 99.5%. With a concentration of 5 weight % and a magnetic field of 60.4 kA/m, the heating time to 120° C. is 25 seconds. It drops to 15 seconds with a field of 65.6 kA/m, and to 8 seconds with 10 weight % and the same field of 65.6 kA/m. The shear strength of the glueing is on the order of 75%, in the first two cases, of the strength obtained by furnace heating. The magnetic and electric properties of the pigment are the same as those of Example 1.

EXAMPLE 4

Ferrite FeMnZn from TDK, type PQ 32. First, this ferrite was ground and sifted to obtain a particle size of less than 45 μm. The resistivity of the material is 6.5 Ω per meter, and the coercive field Hc at ambient temperature is 14 A/m, and the maximum induction Bs is 510 mT. The adhesive used is of the FPM 90096 type, the proportion of fillers by weight was 10%, and the field applied was 65.6 kA/m. The time to reach 120° C. was 28 seconds, and the shear strength in proportion to the strength with furnace heating was 84%.

EXAMPLE 5

A Philips type 3B1 ferrite FeMnZn was used, having a resistivity of 0.2μ per meter, a coercive field of 30 A/m, a maximum induction Bs of 400 mT, and a Curie point on the order of 160° C. These particles have a size on the order of 20 μm. These fillers were added to one of the components of an epoxy resin with a Chemetall Naftotec 1361 component, in a proportion of 10 weight % in terms of the final mixture. The two components were then mixed. This is a resin whose upper polymerization point is 160° C. To reach 120° C., the heating time in a field of 65.6 kA/m is 25 seconds. 148° C. was reached after 45 seconds, 158° C. after 60 seconds, and 160° C. after 1 minute 30 seconds. This shows that the choice of materials for the fillers having a Curie point close to the temperature of polymerization of the adhesive makes it possible to limit the temperature automatically, without risking overheating.

EXAMPLE 6

Elongated iron particles from Hoganas, type NC 100.24, were used, which had a length to width ratio of ≧3, with a spongy structure, a size less than at least 74 μm, with a resistivity of $10^7$ Ω per meter, a maximum induction of 1000 mT, and a coercive field Hc of 10 A/m. These particles produce mainly Foucault current losses, and hence their relatively large size. They were mixed in a proportion of 20 weight % in an adhesive of the Togocoll type. With a field of 60.4 kA/m, the heating time to 120° C., with the temperature at the interface with the substrate not dropping below 90° C., is 20 seconds. The strength obtained was 51.5% of the strength obtained by furnace heating.

EXAMPLE 7

In this example, Bekaert ® stainless steel fibers were used as fillers, in a proportion of 2.5 weight %. Their resistivity is $74 \cdot 10^{-8}$ Ω per meter, the coercive field is 20 A/m, the remanent induction is 0.9 mT, and the size of the fibers is 2000/8 μm. The field applied was 56 kA/m. The time of heating to 120° C. was 26 seconds, and the strength of the bond was 55%.

EXAMPLE 8

5% of flakes of Novamet nickel 25×0.4 μm in size, having a resistivity of $10^7$ Ω per meter, a coercive field of 10 A/m and an induction of 700 mT were mixed. With an applied magnetic field of 65.4 kA/m, the duration of heating to reach 120° C., is 20 seconds with 5 weight % of fillers, and 12 seconds with 10 weight %. The shear strength of the bond is 60% compared with furnace polymerization.

EXAMPLE 9

Nickel was used in the form of spongy particles from Sheritt-Gordon, with a size of less than 30 μm, in a proportion of 10 weight %. With an applied magnetic field of 65.4 kA/m, the heating time to 120° C. is 22 seconds, and the shear strength of the bond is 68% of that obtained by furnace polymerization.

EXAMPLE 10

As has been noted above, if the rise in temperature is too fast to furnish the necessary energy, the heating may be repeated after a certain cooling.

Magnetite from Example 1 was used again in a proportion of 5 weight % and heated in a magnetic field of 60.4 kA/m for 30 seconds to reach 120° C., then cooled for less than 60 seconds and reheated for 15 seconds. The shear strength of the bond is 80%.

EXAMPLE 11

The flakes of Novamet nickel from Example 9 were used again in the same proportion. After the first heating for 20 seconds, they were allowed to cool to approximately 100° C. for less than 30 seconds, and reheated for 10 seconds. The shear strength obtained was then 82%.

EXAMPLE 12

This example involves making a laminate by glueing together two sheets of paper 20 μm in thickness, each of which is coated with a layer of polyethylene 35 μm in thickness; the paper contains 2 weight % of Cerac magnetite as in Example 3. The magnetic field applied is 60.4 kA/m. The temperature of the polyethylene rose to 90° C. in 10 seconds. The peel strength rose to 3.5 N/15 mm at a peeling speed of 127 mm per minute.

EXAMPLE 13

As in Example 13, this involves glueing together two sheets of paper. In this case, 1 weight % of Cerac magnetite is mixed with the polyethylene, and the paper is coated by extrusion at 280° C. and on an aluminum-paper composite. Two pieces of these thus-covered sheets are joined together by their filled polyethylene-coated faces and subjected to a magnetic field of 57.6 kA/m. After 5 seconds, the pieces are glued. Immediately afterward, the peel strength test was performed and gave results of approximately 2.5 N/15 mm at a peeling speed of 127 mm per minute.

EXAMPLE 14

This example relates to glueing SMC-type substrates, in which the substrate is filled with ferromagnetic or ferrimagnetic particles or fibers in such a way that the substrate heats at the same time as the adhesive, which makes it possible to lower the temperature gradient.

A sheet 4 mm in thickness is produced by adding 2.5 weight % of magnetite in the form of fibers obtained by extraction from the molten material (L/D ratio=100 and D=50μ) in a two-component epoxy adhesive polymerized at 180° C. in the furnace. Two pieces intended to be glued together by covering as described above are cut out. As in the previous examples, a single-component epoxy adhesive, to which 7.5 weight % of ferrite from example 4 is added, is placed between them, and a bond 3 mm in thickness is formed between the SMC sheets and heated with a magnetic field of 49.6 kA/m. After 15 seconds, the temperature of the substrate is 90° C. and that of the adhesive is 140° C. The shear strength represents 80% of the strength with furnace polymerization.

Filling the substrate and the adhesive makes it possible to reduce the heating time and increase the strength of the glueing, and the fillers of the substrate can at the same time serve as reinforcements when they are in the form of fibers.

We claim:

1. In a process for glueing together two nonmetallic substrates by means of a hot polymerizable adhesive wherein the thermal conductivity of the substrates and of the adhesive is less than $0.9 W/m °C.$, and between 1 and 20 weight % of ferromagnetic or ferrimagnetic filler material is distributed within at least one of the substrates or the adhesive, and the whole is subjected to a magnetic field with a frequency of between 10 kHz and 1 MHz in order to heat the filler material by induction and thereby facilitate the desired bonding, the improvement wherein filler material is used which comprises, particles in a size range decreasing from 100,000 to 1 $\mu m^3$ for materials the corresponding resistivities of which grow from 10 to $10^{-1} \Omega$ per meter, the corresponding coercive fields of which grow from 10 to 12,000 A/m and the corresponding induced magnetic fields of which grow from 0.5 mT to 10,000 mT, such that the addition of the Foucault current losses and hysteresis losses makes it possible to produce a power of these fillers of from 1000 to 10,000 W/cm$^3$, and that the heating temperature is limited to approximately the maximum temperature of polymerization of the adhesive by fixing the duration at less than 60 seconds, so that the energy thus produced heats the adhesive and so that the temperature at the adhesive/substrate interface corresponds at least to the minimum temperature of polymerization in order to obtain a shear strength greater than 50% of the strength of the glueing together of the substrates when the adhesive is furnace polymerized.

2. The process for glueing of claim 1, characterized in that fiber particles in acicular form are chosen.

3. The process for glueing of claim 1, characterized in that a coercive magnetic field of between 10 and 100 kA/m is applied.

4. The process of claim 1, characterized in that for ferromagnetic metallic fillers, the resistivity is chosen to be less than $10^{-6} \Omega$ per meter.

5. The process of claim 1, characterized in that fillers in the form of flakes whose size does not exceed 30 $\mu m$ are chosen.

6. The process of claim 1, characterized in that the particles are chosen in the form of fibers.

7. The process of claim 1, characterized in that particles are chosen.

8. The process of claim 1, characterized in that the heating temperature is limited by choosing fillers whose Curie point is near the maximum temperature of polymerization.

9. The process of claim 1, characterized in that heating is done up to the upper temperature of polymerization of the adhesive, it is left to cool until approximately the lower temperature of polymerization, and it is reheated at least a second time up to the upper temperature of polymerization.

* * * * *

UNITED STATES PATENT AND TRADEMARK OFFICE
CERTIFICATE OF CORRECTION

PATENT NO.    : 5,447,592

DATED         : September 5, 1995

INVENTOR(S)   : BERCE et al.

It is certified that error appears in the above-identified patent and that said Letters Patent is hereby corrected as shown below:

Claim 1, column 9, line 26, change "10-[Ω" to --$10^{-8}$ Ω--.

Signed and Sealed this

Twelfth Day of December, 1995

Attest:

BRUCE LEHMAN

Attesting Officer

Commissioner of Patents and Trademarks